United States Patent
Fiessler

(10) Patent No.: US 12,427,564 B2
(45) Date of Patent: Sep. 30, 2025

(54) FORMING PRESS AND METHOD FOR OPERATING A FORMING PRESS

(71) Applicant: Fiessler Elektronik GmbH & Co. KG, Aichwald (DE)

(72) Inventor: Lutz Fiessler, Aichwald (DE)

(73) Assignee: Fiessler Elektronik GmbH & Co. KG, Aichwald (DE)

( * ) Notice: Subject to any disclaimer, the term of this patent is extended or adjusted under 35 U.S.C. 154(b) by 0 days.

(21) Appl. No.: 17/839,666

(22) Filed: Jun. 14, 2022

(65) Prior Publication Data

US 2022/0395890 A1 Dec. 15, 2022

(30) Foreign Application Priority Data

Jun. 15, 2021 (EP) ..................................... 21179535

(51) Int. Cl.
| | |
|---|---|
| *B21D 55/00* | (2006.01) |
| *B21D 5/00* | (2006.01) |
| *B21D 7/12* | (2006.01) |
| *F16P 3/00* | (2006.01) |
| *F16P 3/14* | (2006.01) |

(52) U.S. Cl.
CPC ............. *B21D 55/00* (2013.01); *B21D 5/002* (2013.01); *F16P 3/001* (2013.01); *F16P 3/14* (2013.01); *B21D 7/12* (2013.01)

(58) Field of Classification Search
CPC ........ B21D 55/00; B21D 5/002; B21D 5/004; B21D 5/02; B21D 5/0209; B21D 7/12; B21D 7/16; B21D 11/22; F16P 3/001; F16P 3/02; F16P 3/04; F16P 3/06; F16P 3/14

See application file for complete search history.

(56) References Cited

U.S. PATENT DOCUMENTS

| | | | | |
|---|---|---|---|---|
| 2002/0104958 A1* | 8/2002 | Fiessler | ................. | B30B 15/285 250/221 |
| 2002/0134922 A1 | 9/2002 | Appleyard et al. | | |
| 2013/0269962 A1* | 10/2013 | Fiessler | ................... | B25B 29/00 173/1 |
| 2015/0314364 A1* | 11/2015 | Fiessler | ................. | B21D 55/00 72/1 |

(Continued)

FOREIGN PATENT DOCUMENTS

| | | |
|---|---|---|
| EP | 2940369 A1 | 11/2015 |
| EP | 3444044 A1 | 2/2019 |

(Continued)

*Primary Examiner* — Jared O Brown
*Assistant Examiner* — Matthew Stephens
(74) *Attorney, Agent, or Firm* — Hoffmann & Baron, LLP

(57) ABSTRACT

A forming press having a machine bed on which a first tool is arranged, and having a tool carrier which is accommodated to the machine bed such that it can move relative thereto and further including a second tool and a drive for moving the tool carrier and a machine control for controlling the drive, and having a safety control for disabling the drive, wherein the safety control deactivates a first radiation detector if a first status signal, which results from a comparison between a first current position value with a first deactivation position value matches with a second status signal which results from a comparison between a second current position value with the first deactivation position value.

10 Claims, 3 Drawing Sheets

(56) References Cited

U.S. PATENT DOCUMENTS

| | | | |
|---|---|---|---|
| 2018/0126682 A1* | 5/2018 | Fiessler | ................. B21D 55/00 72/1 |
| 2020/0180003 A1 | 6/2020 | Jungmayr et al. | |
| 2020/0324332 A1 | 10/2020 | Fiessler | |

FOREIGN PATENT DOCUMENTS

| | | |
|---|---|---|
| EP | 3722651 A1 | 10/2020 |
| WO | 2018090069 A1 | 5/2018 |

* cited by examiner

FORMING PRESS AND METHOD FOR OPERATING A FORMING PRESS

BACKGROUND OF THE INVENTION

The invention relates to a forming press comprising a machine bed on which a first tool is arranged, and comprising a tool carrier which is accommodated on the machine bed so as to be relatively movable with respect to the machine bed, wherein a second tool is accommodated on the tool carrier and further comprising a drive for moving the tool carrier, wherein the first tool and the second tool define a working gap of variable size, the forming press further comprising a machine control for controlling the drive and a safety control for disabling the drive, the safety control being electrically connected to at least one radiation source which provides radiation beams, and to a plurality of radiation detectors, which radiation detectors are arranged opposite the radiation source, wherein at least a part of the radiation beams emanating from the radiation source are aligned along a working edge of the first tool, the drive comprising a position measuring system which provides position signals as a function of a position of the tool carrier relative to the machine bed, wherein the machine control comprises a first position detection system for cyclic processing of the position signals in a first, fast working cycle to calculate first position values, and wherein the safety control comprises a second position detection system for cyclic processing of the position signals in a second, slow working cycle to calculate second position values.

Furthermore, the invention relates to a method for operating a forming press.

EP 2 940 369 A1 discloses a forming press having a machine bed and a tool carrier which is accommodated thereon in a relatively movable manner and is coupled to a drive, a machine control for controlling the drive and a monitoring system which is designed to monitor movements of the tool carrier and to control a switch, in particular a contactor, connected upstream of the drive, and having two position detection systems which are each designed to output position signals for determining the position of the tool carrier with respect to the machine bed, the first position detection system being designed for cyclic provision of first position signals in a first, fast operating cycle, and the second position detection system being designed for cyclic provision of second position signals in a second, slow operating cycle, and at least one radiation detector being deactivated if, during a comparison, the value falls below a predetermined difference between the first and the second position signal.

SUMMARY OF THE INVENTION

The task of the invention is to provide a forming press as well as a method for operating a forming press, in which an improved position-dependent deactivation of a radiation detector is made possible.

This task is solved for a forming press of the type mentioned above in that the safety control compares a first status signal with a second status signal for a deactivation of a first radiation detector at a predetermined first deactivation position, wherein the first status signal is determined by a comparison of a first current position value with a first deactivation position value, wherein the first current position value is obtained, in particular by the machine control, by adding a first position correction value to the first position value, and wherein the second status signal is determined by a comparison of a second current position value with the first deactivation position value, wherein the second current position value is, in particular by the safety control, obtained by adding a second position correction value to the second position value, and wherein the safety control carries out the deactivation when the first status signal matches the second status signal.

Preferably, the first status signal and the second status signal each are a logic state such as a logic high signal or a logic low signal, respectively.

Preferably, it is provided that the first status signal is output as a logic high signal in the case that there is identity or substantial correspondence (within a predetermined value interval) between the first current position value and the first deactivation position value, and is otherwise output as a logic low signal.

It is further provided that the second status signal is output as a logic high signal in the event that there is identity or substantial correspondence (within a predetermined value interval) between the second current position value and the first deactivation position value, and is otherwise output as a logic low signal.

In any case, the safety control has the task of determining the second status signal and performing the comparison between the first status signal and the second status signal.

The first status signal can be determined either in the machine control or in the safety control, whereby in the latter case the first position value or the first current position value is provided by the machine control.

This procedure is based on the consideration that the machine control does not have any special provisions that are designed for safety-oriented operation and therefore the first position value determined with the aid of the first position detection system and the first current position value can be subject to error with a greater probability than is the case for the second position value and the second current position value, since these are determined by the safety control designed for safety.

Typically, the machine control system comprises a single processor with which the calculations required for controlling the forming press can be carried out, the determination of the first position value and the first current position value being in this calculation, and thus the processor with its periphery forming the first position detection system.

Furthermore, it is exemplarily provided that the second position value and the second current position value are determined in the safety control using at least two microprocessors operating independently of each other, which microprocessors form the second position detection system. An output of the second current position value by this second position detection system only takes place if there is a match between the second position values and the second current position values determined by the two microprocessors.

This procedure enables a more reliable deactivation of the first radiation detector at the desired deactivation position, since a match between the first current position value, the second current position value and the deactivation position value is required for the deactivation of the first radiation detector.

In the case of external influences that may affect both the first current position value and the second current position value, the comparison of the first current position value with the second current position value and with the first deactivation position value avoid an erroneous deactivation with greater probability than is the case when for example considering a deviation interval between the first and second position signals.

Preferably, the first position correction value is a first constant value and the second position correction value is a second constant value, which are stored in the safety control and which are adapted to the conditions of the respective forming press.

Advantageous further embodiments of the invention are the subject of the subclaims.

It is expedient if the safety control is set up in such a way that a deactivation of a second radiation detector is to be carried out at a predetermined second deactivation position, in particular exclusively, on the basis of the second position value, wherein a distance of the first radiation detector from the second tool being greater than a distance of the second radiation detector from the second tool.

Here it is assumed that with the reaching of the first deactivation position a reduction of the approach speed between the first tool and the second tool is carried out by corresponding control of the drive and that the safety control is able to carry out a safe and sufficiently precise determination of the position of the second tool with respect to the first tool despite the second, slow working cycle.

Accordingly, the first position value calculated with the first, fast working cycle, which is calculated in the machine control and which has a higher probability of error, can be dispensed.

It is preferably provided that the machine control is set up in such a way that the first position correction value is determined on the basis of a first, in particular maximum, approach speed for the approach of the second tool to the first tool and a first cycle time for the first working cycle, and that the safety control is set up in such a way that the second position correction value is determined on the basis of the first, in particular maximum, approach speed and a second cycle time for the second working cycle.

The first position correction value has a smaller amount compared to the second position correction value and thus represents that the machine control is operated with a fast working cycle, which results in a short first cycle time for the calculation of the first position value.

The first position correction value corresponds to the distance covered by the second tool relative to the first tool within the first cycle time, based on a uniform movement between the first tool and the second tool.

Accordingly, the first current position value which is obtained by addition of the first position correction value and the first position value represents the current position of the second tool relative to the first tool.

The second position correction value represents that distance which the second tool has covered relative to the first tool within the second cycle time, again based on a uniform movement between the first tool and the second tool.

Accordingly, the second current position value, which is obtained by addition of the second position correction value and the second position value also corresponds to the current position of the second tool relative to the first tool.

In a further development of the invention, it is provided that the safety control is set up in such a way that the first radiation detector is deactivated only if the second current position value is present temporally before the first current position value.

Taking into account the sequence or sequential arrival of the second current position and the first current position this ensures that the safety-relevant deactivation of the first radiation detector does not take place too early a point in time, at which a hazard to a user could possibly still occur, if the first radiation detector were already switched off.

The invention also relates to a method for operating a forming press comprising the steps of: Determining position signals of a position measuring system for calculating a time-variable distance between a first tool, which is arranged on a machine bed, and a second tool, which is fixed to a tool carrier accommodated on the machine bed so as to be relatively movable to the machine bed and which second tool determines a size-variable working gap with the first tool, and processing the position signals in a first position detection system of a machine control, which is operated with a first, fast working cycle, to calculate first position values, and processing the position signals in a second position detection system of a safety control, which is operated with a second, slow working cycle, to calculate second position values, processing a first detector signal of a first radiation detector and processing a second detector signal of a second radiation detector, which are arranged at a first lateral end region of the second tool and which are illuminated by a radiation source arranged oppositely at a second end region of the second tool, in the safety control, wherein a distance of the first radiation detector to the second tool is greater than a distance of the second radiation detector to the second tool, enabling of a power supply for a drive coupled to the tool carrier by the machine control and the safety control in the case of a gap width of the working gap which is greater than a predetermined gap width, in order to reduce the gap width of the working gap with a first, in particular maximum, approach speed between the first tool and the second tool, carrying out a comparison between a first status signal and a second status signal, wherein the first status signal is obtained by comparing a first current position value, which is to obtained by the machine control or by the safety control by adding a first position correction value and the first position value with a first deactivation position value, and wherein the second status signal is obtained by comparing a second current position value, which is obtained by the safety control by adding a second position correction value and the second position value with the first deactivation position value, and deactivating the first radiation detector in the presence of a match between the first status signal and the second status signal.

In a further embodiment of the invention, it is provided that the deactivation of the first radiation detector is accompanied by a switchover of the drive from the first (high) approach speed to a second, in particular medium, approach speed.

In a further embodiment of the method, it is provided that a deactivation of the second radiation detector is performed by the safety control at a second deactivation position if the second position value coincides with the second deactivation position.

In a further embodiment of the method, it is provided that the deactivation of the second radiation detector is accompanied by a switchover of the drive from the second (medium) approach speed to a third, in particular low, approach speed.

In a further embodiment of the method, it is provided that the first position correction value is determined on the basis of the first approach speed and a first cycle time for the first operating cycle, and that the second position correction value is determined on the basis of the first approach speed and a second cycle time for the second operating cycle.

Preferably, for the method it is provided that the first deactivation position value represents a first distance to a first deactivation position for the deactivation of the first radiation detector, wherein the first distance is dimensioned such that the comparison between the first current position value and the second current position value performed by the safety control within the second working cycle is completed before the tool carrier reaches the first deactivation position.

BRIEF DESCRIPTION OF THE DRAWINGS

An advantageous embodiment of the invention is shown in the drawing. Here shows.

DETAILED DESCRIPTION

Figure 1:
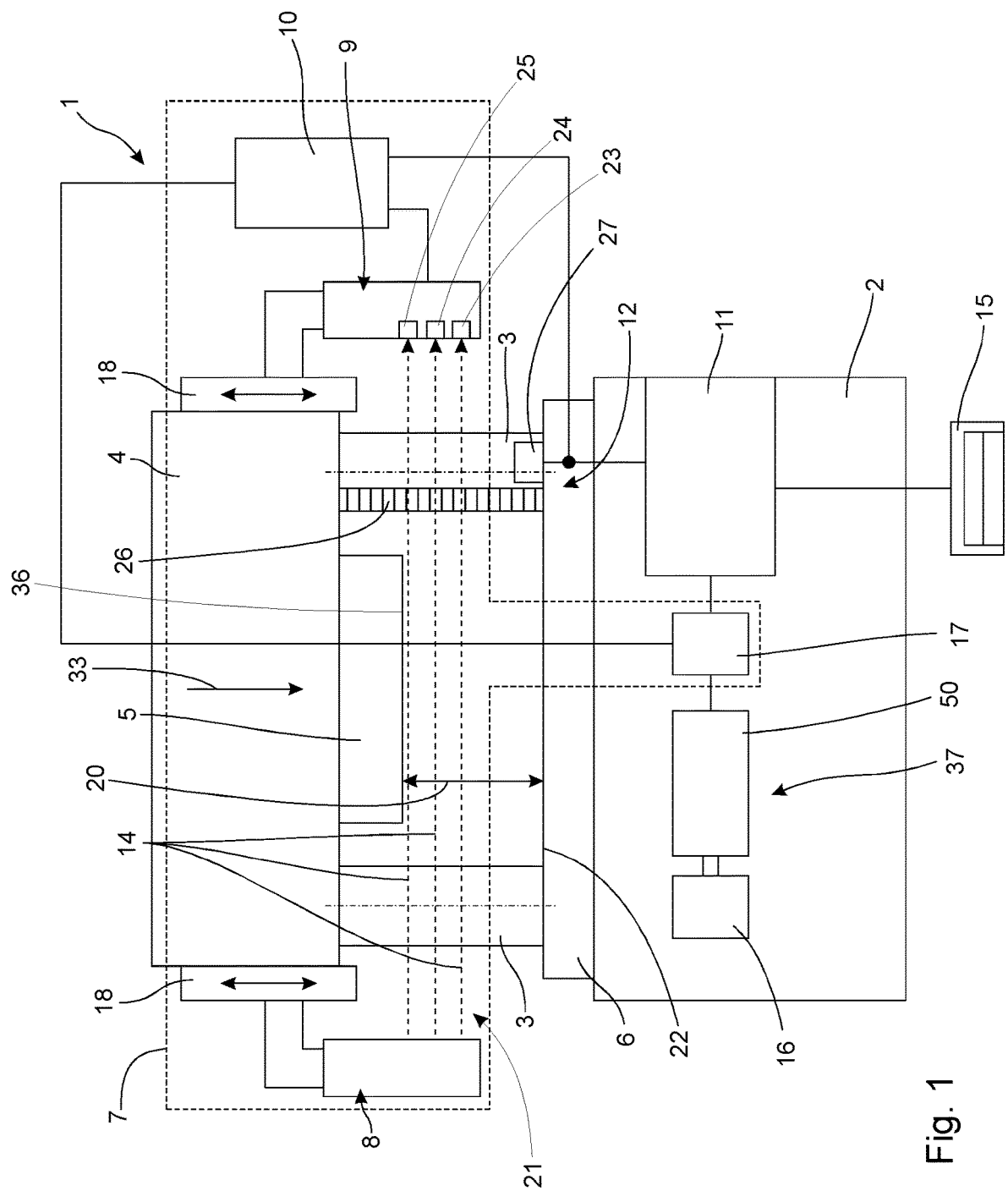
FIG. 1 a schematic front view of a forming press.
Figure 2:
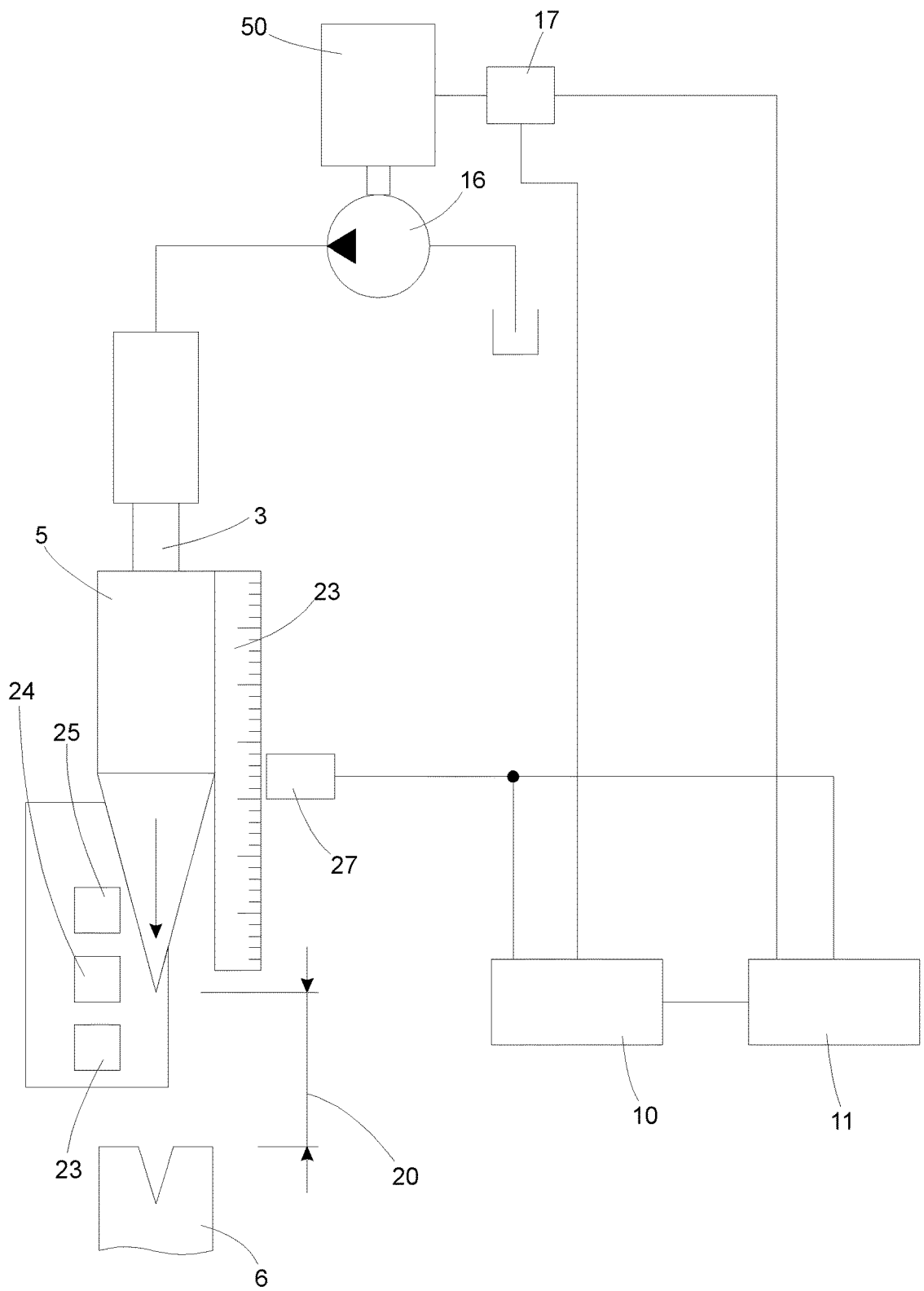
FIG. 2 a schematic representation of the essential functional components of the forming press according to FIG. 1, and FIG. 3 a flow chart for determining a blanking position.

A forming machine exemplarily designed as a die bending machine 1 according to FIG. 1 comprises a machine bed 2, to which two guide rods 3 are attached, which are designed for a linearly movable bearing of a tool carrier 4.

The tool carrier 4 can be moved linearly in the vertical direction along the guide rods 3 in order to move a punch 5, serving as a tool and designated as a first tool, relative to a die 6 designated as a second tool.

When the punch 5 is moved in a closing movement direction 33, a working gap 20 between the punch 5 and the die 6 is reduced so as to allow deformation of a workpiece, for example a metal sheet, which is not shown and can be inserted into the working gap 20 between the punch 5 and the die 6.

The die bending machine 1 is equipped with a monitoring system 7, exemplarily constructed from several components, which is provided to minimize the risk of injury by the die bending machine 1 and to ensure a rapid and trouble-free processing sequence for the workpieces to be processed.

Exemplarily, the monitoring system 7 comprises a light grid 21 mounted on the tool carrier 4 with a transmitter 8 and a receiver 9.

The transmitter 8 provides a plurality of detection beams 14 which, in a purely exemplary manner, are aligned parallel to a longest edge 22 of the die 6 and can be received by radiation detectors 23, 24, 25 of the receiver 9.

The radiation detectors 23, 24, 25 of the receiver 9 each provide electrical signals to a safety control 10 insofar as detection beams 14 of the light grid impinge on the respective light-sensitive radiation detectors 23, 24, 25, which are not shown in greater detail.

Accordingly, the safety control 10 can determine which of the detection beams 14 is io interrupted, for example by an intervention of a user in a hazardous area, and bring about an appropriate reaction depending on the size of the working gap 20.

The die bending machine 1 further comprises a machine control 11 which is electrically coupled to a sensor 27 of a position measuring system 12, to a foot switch 15, and to the safety control 10, respectively.

The machine control 11 may be exemplarily designed as a computer numerical control (CNC control).

The machine control 11 enables the input of information about the geometries of the punch 5, the die 6 and the workpiece (not shown), as well as about the desired deformation of the workpiece by a user, and determines from this the movement sequence for the punch 5 relative to the die 6.

The foot switch 15 enables the motion sequence to be triggered by an operator.

In addition to the sensor 27, the position measuring system 12 comprises a glass scale 26 which is attached to one of the guide rods 3. The glass scale 26 serves as a measuring standard and can be scanned by the sensor 27 in a contactless manner, in particular optically. The sensor 27 being set up to provide an electrical position signal from which a position of the punch 5 relative to the die 6 can be determined.

For the initiation of a movement on the tool carrier 4 shown in FIG. 1 and the punch 5 received thereon, the die bending machine 1 comprises a drive 37 which can be controlled by the machine control 11.

Exemplarily, the drive 37 comprises an electric motor 50 which is coupled to a hydraulic pump 16 which can provide an oil flow to hydraulic cylinders (not shown) which are associated with the guide rods 3.

For providing the electrical energy required for this purpose, the electric motor 50 is electrically connected to the machine control 11.

For safe operation of the drive 37, a switch 17, in particular a contactor, is looped into to the electrical connection between the machine control 11 and the electric motor 50, which switch 17 can be controlled by the safety control 10 and which also forms a component of the monitoring system 7.

In a variant of the switch (not shown), the switch comprises shut-off valves for the oil flow to the hydraulic cylinders which are arranged between the oil pump and the hydraulic cylinders.

Adaptation of the position of the light grid 21 to punches 5 of different heights is made possible by the fact that the transmitter 8 and the receiver 9 are each accommodated on the tool carrier 4 in a linearly movable manner by means of guide means 18.

Preferably, the guide means 18 for the transmitter 8 and for the receiver 9 are motion-coupled to each other in such a way that a synchronous (height) adjustment of the two guide means 18 is ensured.

Exemplarily, it is provided that the position measuring system 12 and the machine control 11 are designed according to a first safety category of a safety standard, while the safety control 10 is designed according to a second, higher safety category of the safety standard and thus fulfills increased safety requirements.

By way of example, the safety control 10 comprises at least two processors operating independently of one another, which are designed to perform similar arithmetic operations and each perform a mutual (cross) check, in order, for example, to be able to reduce the probability of an incorrect position determination for the punch 5 with respect to the dies 6.

The machine control 11 is designed to process the position signal provided by the sensor 27 at a clock frequency of, for example, 1 kHz, which is also referred to as the first operating clock, so that a first position value output by the machine control 11 can be provided after a very short period of time, for example millisecond or only a few milliseconds.

In contrast, the safety control 10 is significantly slower, since due to the requirements of the higher safety category to be taken as a basis for the safety control 10, a more extensive calculation and checking of the second position value calculated on the basis of the position signal is required, so that an output of the second position value by the safety control 10 is to carried out with a low clock frequency, exemplarily with a clock frequency of 100 Hertz.

As a result a position signal provided by the sensor 27 and calculated by the machine control 11 as a first position value, for example, is available after only one millisecond, but a second position value calculated by the safety control 10 is available after 10 milliseconds, so that no direct comparison of the first position value with the second position value can be made.

In order to be able to carry out a meaningful comparison between the first position value and the second position value and, in particular, to be able to carry out a deactivation of a radiation detector 23, 24, 25 as a function of a position of the stamp 5, it is provided that the machine control 11 provides the respective latest first position value to the safety control 10 and the safety control 10 carries out further processing of both the first position value and the second position value.

For this purpose, it is provided that the safety control 10 adds the latest first position value provided by the machine control 11 and a first position correction value to obtain a first current position value.

It is further provided that the safety control adds the respective current second position value and a second position correction value to obtain a second current position value.

Subsequently, a comparison can be made in the safety control 10 between the first current position value, the second current position value and a deactivation position value stored in the safety control 10.

Exemplarily, it can be provided that a deactivation of the first radiation detector 23 is carried out at a point in time that occurs immediately before an interruption of the assigned detection beam 14 by the approach of the tool carrier 4 equipped with the light grid 21 to the die 6.

This prevents a safety-related disconnection of the drive 37 by the safety control 10 and the associated switch.

By way of example, it is provided that the first position correction value is calculated in such a way that it corresponds to that distance which the tool carrier 4 travels at a first closing speed, in particular a maximum closing speed, during the period of time required for to calculation of the first position value by the machine control 11.

Furthermore, in a purely exemplary manner, it is provided that the second position correction value is calculated in such a way that it corresponds to that distance that the tool carrier 4 travels at the first closing speed during the time span required for the calculation of the second position value by the safety control 10.

The first deactivation position value corresponds to a position of the tool carrier 4 with the punch 5 attached thereto with respect to the die 6, which is distant by a first distance from that position of the tool carrier 4 at which the blanking of the first radiation detector 23 must be carried out in order to prevent the detection beams 14 impinging on the first radiation detector 23 from being interrupted by the die 6 during the reduction of the working gap 20.

In this regard, the first distance corresponds to that distance that the die carrier 4 travels at the first closing speed during the period of time required for the safety control 10 to perform the comparison between the first current position value, the second current position value and the first deactivation position value.

Figure 3:
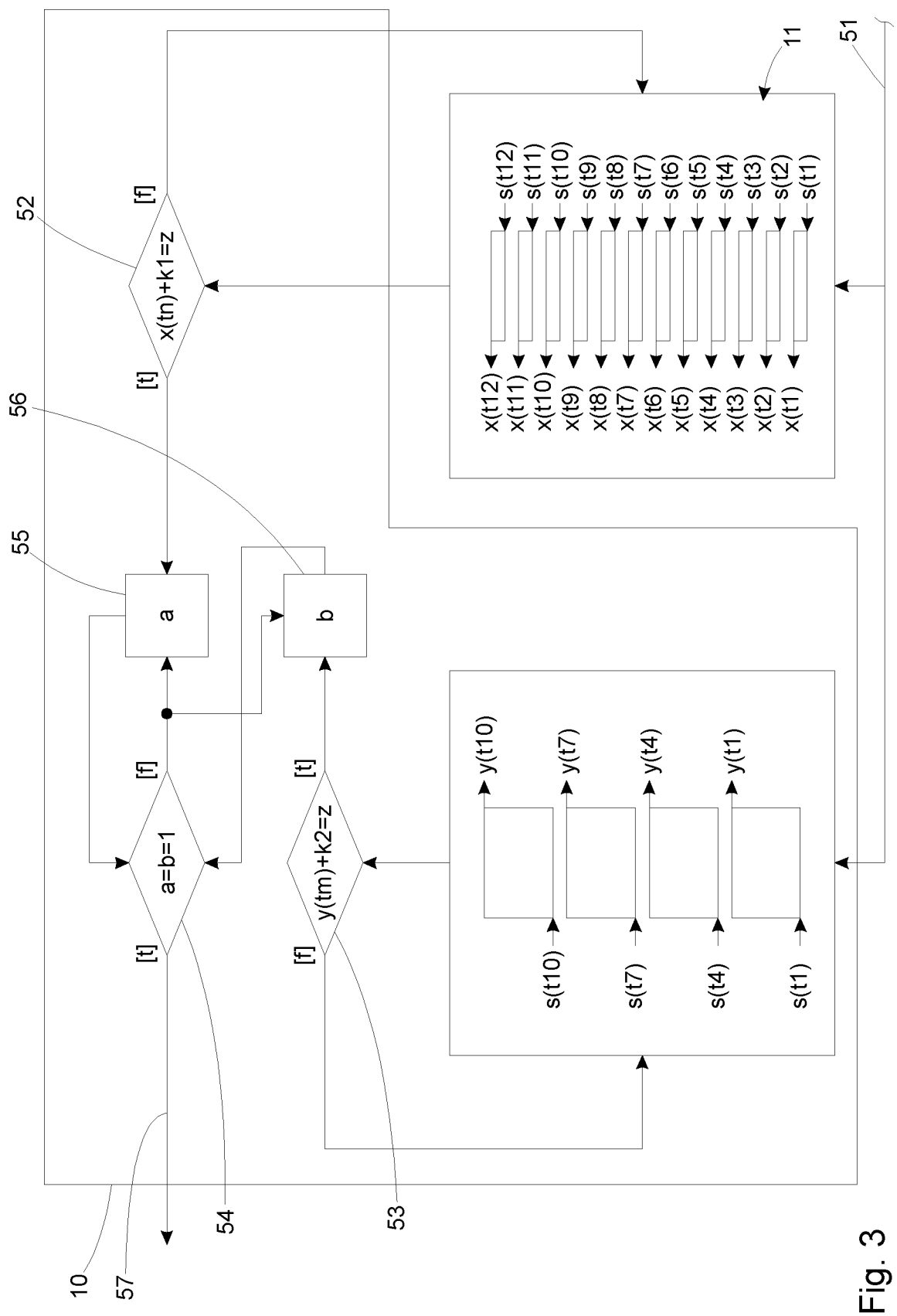

A schematic representation of the procedure for deactivating the first radiation detector 23 is shown in FIG. 3.

Here, it is provided that the position signal of the position measuring system 12 is provided to both the safety control 10 and the machine control 11 via a signal line 51 which is connected to the sensor 27.

In the machine control 11, a calculation of first position values $x(t)$ is carried out from the position signals $s(t)$, whereby it is assumed, purely by way of example, that this calculation is carried out in each case within a time period which corresponds to the first operating cycle of the machine control 11.

In the safety control 10, a calculation of second position values $y(t)$ is carried out, whereby it is assumed, purely by way of example, that this calculation is carried out in each case within a time period which corresponds to the second working cycle of the safety control 10.

Here, the fact that the second operating cycle of the safety control 10 is significantly longer than the first operating cycle of the machine control 11 means that, for example, at a time when the second position value $y(t10)$ calculated in the safety control 11 on the basis of the position signal $s(t10)$ can be output, the first position value $x(t12)$ calculated on the basis of the position signal $s(t12)$ can already be output by the machine control 11.

In order to subsequently be able to check the existence of the condition for blanking or deactivating the first radiation detector, which is formulated in such a way that the positions calculated by the safety control 10 and by the machine control 11 match the first deactivation position value, additional measures are still required.

For this purpose, the first position value $x(t)$ output by the machine control 11 is transmitted to the safety control 10 and added to a first position correction value k1 within the scope of a first arithmetic operation 52 in the safety control 10, and then a comparison with the first deactivation position value z is made within the scope of the first arithmetic operation 52.

Alternatively, it can be provided that the first arithmetic operation 52 and the comparison are performed in the machine control 11.

If the comparison is positive [t], a logic high level $a=1$ serving as a first status signal is output from the first arithmetic operation 52 to a first buffer 55.

If, on the other hand, this comparison turns out to be negative [f], an updated first position value $x(t+1)$ is requested by the machine control 11 and a logic low level $a=0$ is output to the first buffer 55.

Furthermore, the second position value $y(t)$ determined by the safety control 10 is added to a second position correction value k2 as part of a second arithmetic operation 53 in the safety control 10, and a comparison is then made with the first deactivation position value z as part of the second arithmetic operation 53.

If this comparison is positive [t], a logic high level $b=1$ serving as a second status signal is output from the second arithmetic operation 53 to a second buffer 56.

If, on the other hand, this comparison turns out to be negative an updated first position value $y(t+1)$ is requested by the safety control 10 and a logic low level $b=0$ is output to the second buffer 56.

to A third arithmetic operation 54 is further performed in the safety control 10, which consists of comparing the logic level a (first status signal) stored in the first buffer 55 and the logic level b (second status signal) stored in the second buffer 56 with the high level 1.

In the event that the condition $a=b=1$ is satisfied, the safety control 10 provides a blanking signal 57.

The blanking signal 57 can be used, for example, within the safety control 10 to interrupt a processing of sensor signals of the first radiation detector 23 so that a change in a signal level of the first radiation detector 23 does not lead to a control of the switch 17.

Exemplarily, the die bending machine 1 can be operated as follows: first, a self-test of the light grid 21 is performed in a rest position of the tool carrier 4 in which the tool carrier 4 is at a maximum distance from the machine bed 2 and the die 6 attached thereto.

Here, it is checked whether the detector beams 14 trigger corresponding signals when they impinge on the radiation detectors 23, 24, 25.

Furthermore, a positioning of the transmitter 8 and the receiver 9 of the light grid 21 is carried out by means of the guiding means 18 as a function of a geometric dimension, in particular a vertical extension, of the punch 5 which is received on the tool carrier 4.

The geometry of the punch 5 is taken into account, as is the overtravel distance of the tool carrier 4, which can also be referred to as the braking distance and describes the distance that the tool carrier 4 travels when an interruption of the light grid 21 is detected.

This distance depends in particular on the second working cycle of the safety control 10 as well as on the reaction time of the switch 17 and the respective closing speed, i.e. the approach speed of punch 5 and die 6.

Preferably, it is provided here that the first radiation detector 23 is arranged at such a distance from the working edge 36 of the punch 5 that this distance between the first radiation detector 23 and the working edge 36 corresponds at least to the overtravel.

Subsequently, after placing the workpiece on the die 6, the user can initiate machining by actuating the foot switch 15.

For this purpose, a predetermined movement sequence is provided for the punch 5, to which may exemplarily comprise the following steps.

In a first step after actuation of the foot switch 15, the tool carrier 4 is accelerated to a first (maximum) closing speed, which is also referred to as "fast motion" or "rapid motion".

During this rapid movement, monitoring of all radiation detectors 23, 24, 25 takes place, as an example.

Provided that no interruption of at least one of the detection beams 14 is detected by the radiation detectors 23, 24, 25 when the tool carrier 4 approaches the die 6, it is provided that the signals of the first radiation detector 23 are blanked out when a predetermined distance between punch 5 and die 6 is reached.

This blanking prevents an undesired activation of the switch 17, which would otherwise occur due to the interruption of the detection beams 14 impinging on the radiation detector 23.

In order to carry out this blanking, it is provided that both the safety control system 10 and the machine control system 11 each determine position values on the basis of the position signals of the position measuring system 12, which position values are subsequently further processed in the safety control system 10 using position correction values to form current position values, which in turn can be compared with the first deactivation position value in order to determine therefrom the first or, respectively, the second status signal.

If the first status signal a and the second status signal b match, deactivation of the first radiation detector 23 can then be performed.

Furthermore, at the time of deactivation of the first radiation detector 23, a switchover can also be made from the first approach speed (maximum closing speed) to a second approach speed (medium closing speed), respectively, in order to prevent the punch 5 from hitting the workpiece too quickly.

What is claimed is:

1. A forming press comprising:
   a machine bed, on which a first tool is arranged;
   a tool carrier which is accommodated on the machine bed so as to be relatively movable with respect to the machine bed, wherein a second tool is accommodated to the tool carrier;
   a drive for moving the tool carrier, wherein the first tool and the second tool determine a working gap of variable size;
   a machine control for controlling the drive; and
   a safety control for disabling the drive, the safety control being connected to at least one radiation source which provides radiation beams and the safety control being further connected to a plurality of radiation detectors, which radiation detectors are arranged opposite the radiation source,
   wherein at least part of the radiation beams emanating from the radiation source being aligned along a working edge of the first tool, the drive comprising a position measuring system which provides a position signal as a function of a position of the tool carrier relative to the machine bed, the same position signal being provided to both the machine control and the safety control,
   wherein the machine control comprises at least one processor for cyclic processing of said position signal provided by the position measuring system in a first fast working cycle to calculate a first position value,
   wherein the safety control comprises at least one processor for cyclic processing of said position signal provided by the position measuring system in a second, slow operating cycle to calculate a second position value, wherein the second, slow operating cycle of the safety control is longer than the first fast working cycle of the machine control, and wherein the second position value is calculated using only said position signal provided by the position measuring system,
   wherein the safety control compares a first status signal with a second status signal for a deactivation of a first radiation detector at a predetermined first deactivation position, wherein the first status signal is determined by a comparison of a first current position value with a first deactivation position value,
   wherein the first current position value is obtained by adding a first position correction value to the first position value,
   wherein the second status signal is determined by a comparison of a second current position value with the first deactivation position value, wherein the second current position value is obtained by adding a second position correction value to the second position value, and
   wherein the safety control carries out the deactivation when the first status signal matches the second status signal.

2. The forming press according to claim 1, wherein the safety control deactivates a second radiation detector at a predetermined second deactivation position on the basis of the second position value, wherein a distance of the first radiation detector from the second tool is greater than a distance of the second radiation detector from the second tool.

3. The forming press according to claim 1, wherein the machine control determines the first position correction value on the basis of a first approach speed for the approach of the second tool to the first tool and a first cycle time for the first working cycle, and wherein the safety control determines the second position correction value on the basis of the first approach speed and a second cycle time for the second working cycle.

4. The forming press according to claim 1, wherein the safety control deactivates the first radiation detector only if the second current position value is present in time before the first current position value.

5. A method for operating a forming press, comprising the steps:
   determining a position signal of a position measuring system for calculating a time-variable distance between a first tool, which is arranged on a machine bed, and a second tool, which is fixed to a tool carrier accommodated to the machine bed in a relatively movable manner and which position measuring system detects a size of a variable working gap between the second tool and the first tool;
   processing the position signal in at least one processor of a machine control, which machine control is operated with a first, fast working cycle, to calculate a first position value based on the position signal determined by the position measuring system; and
   processing the position signal in at least one processor a safety control which is operated with a second, slow operating cycle, to calculate a second position value, the second position value being calculated using only the position signal provided by the position measuring system,
   wherein the second, slow operating cycle of the safety control is longer than the first, fast working cycle of the machine control, and
   wherein the safety control processes a first detector signal of a first radiation detector and processes a second detector signal of a second radiation detector, which are disposed at a first lateral end portion of the second tool and which are illuminated by a radiation source oppositely disposed at a second end portion of the second tool, and
   wherein a distance of the first radiation detector from the second tool is greater than a distance of the second radiation detector from the second tool, and
   wherein the machine control provides a power supply for the drive, which drive is coupled to the tool carrier, if a gap width of the working gap is greater than a predetermined gap width, in order to reduce the gap width of the working gap with a first approach speed between the first tool and the second tool, the safety control carrying out a comparison between a first status signal and a second status signal, and
   wherein the first status signal is obtained by the machine control or by the safety control by a comparison of a first current position value with a first deactivation position value, wherein the first current position value is obtained by adding a first position correction value and the first position value, and
   wherein the second status signal is obtained by comparing a second current position value with the first deactivation position value, wherein the second current position value is obtained by adding a second position correction value and the second position value, and
   wherein the first radiation detector is deactivated when there is a match between the first status signal and the second status signal to avoid a disabling of the drive by the safety control due to an undesired interruption of the detection beams impinging on the radiation detector.

6. The method according to claim 5, wherein the deactivation of the first radiation detector is combined with a switching of the drive from the first approach speed to a second approach speed.

7. The method according to claim 5, wherein a deactivation of the second radiation detector is carried out by the safety control at a second deactivation position if the second position value coincides with the second deactivation position.

8. The method according to claim 7, wherein the deactivation of the second radiation detector is combined with a switching of the drive from the second approach speed to a third approach speed.

9. The method according to claim 5, wherein the first position correction value is determined on the basis of the first approach speed and a first cycle time for the first operating cycle, and wherein the second position correction value is determined on the basis of the first approach speed and a second cycle time for the second operating cycle.

10. The method according to claim 5, wherein the first deactivation position value represents a first distance to a first deactivation position for the deactivation of the first radiation detector, wherein the first distance is dimensioned such that the comparison between the first current position value and the second current position value performed by the safety control within the second working cycle is completed before the tool carrier reaches the first deactivation position.

* * * * *